(12) United States Patent
Lauf et al.

(10) Patent No.: US 6,248,286 B1
(45) Date of Patent: Jun. 19, 2001

(54) METHOD OF MAKING A FUNCTIONALLY GRADED MATERIAL

(75) Inventors: Robert J. Lauf, Oak Ridge; Paul A. Menchhofer, Clinton; Claudia A. Walls, Oak Ridge, all of TN (US)

(73) Assignee: UT-Battelle, LLC, Oak Ridge, TN (US)

(*) Notice: Subject to any disclaimer, the term of this patent is extended or adjusted under 35 U.S.C. 154(b) by 0 days.

(21) Appl. No.: 09/453,774

(22) Filed: Dec. 3, 1999

(51) Int. Cl.$^7$ ........................................ B28B 1/14
(52) U.S. Cl. .................. 264/621; 264/642; 419/5; 419/6
(58) Field of Search .................. 264/621, 642; 419/5, 6

(56) References Cited

U.S. PATENT DOCUMENTS

| | | |
|---|---|---|
| 4,894,194 | 1/1990 | Janney . |
| 5,028,362 | 7/1991 | Janney et al. . |
| 5,145,908 | 9/1992 | Janney et al. . |
| 5,198,282 * | 3/1993 | Baker et al. .................... 428/114 |
| 5,653,924 * | 8/1997 | Ishibashi et al. .................. 264/86 |
| 5,746,957 * | 5/1998 | Fanelli et al. .................... 264/109 |
| 5,824,250 * | 10/1998 | Whalen et al. ................... 264/219 |
| 5,885,493 | 3/1999 | Janney et al. . |
| 6,004,500 * | 12/1999 | Safari et al. ..................... 264/610 |

* cited by examiner

Primary Examiner—Christopher A. Fiorilla
(74) Attorney, Agent, or Firm—Joseph A. Marasco

(57) ABSTRACT

A gelcasting method of making an internally graded article includes the steps of: preparing at least two slurries, each of the slurries including a different gelcastable powder suspended in a gelcasting solution, the slurries characterized by having comparable shrinkage upon drying and sintering thereof; casting the slurries into a mold having a selected shape, wherein relative proportions of the slurries is varied in at least one direction within the selected shape; gelling the slurries to form a solid gel while preserving the variation in relative proportions of the slurries; drying the gel to form a dried green body; and sintering the dry green body to form a solid object, at least one property thereof varying because of the variation in relative proportions of the starting slurries. A gelcasting method of making an internally graded article alternatively includes the steps of: preparing a slurry including a least two different phases suspended in a gelcasting solution, the phases characterized by having different settling characteristics; casting the slurry into a mold having a selected shape; allowing the slurry to stand for a sufficient period of time to permit desired gravitational fractionation in order to achieve a vertical compositional gradient in the molded slurry; gelling the slurry to form a solid gel while preserving the vertical compositional gradient in the molded slurry; drying the gel to form a dried green body; and sintering the dry green body to form a solid object, at least one property thereof varying along the vertical direction because of the compositional gradient in the molded slurry.

5 Claims, 2 Drawing Sheets

METHOD OF MAKING A FUNCTIONALLY GRADED MATERIAL

The United States Government has rights in this invention pursuant to contract no. DEAC05-96OR22464 between the United States Department of Energy and Lockheed Martin Energy Research Corporation.

FIELD OF THE INVENTION

The present invention relates to functionally graded materials (FGM) and methods of making same, and more particularly to making functionally graded materials via slurry processing methods.

BACKGROUND OF THE INVENTION

The goal of most ceramic forming processes is to create a green body that is as homogeneous as possible, so that the structure will be very uniform after sintering. It is well known that even minor inhomogeneities in the green body can lead to stresses, distortions, and poor mechanical properties (even fracture) of the object after sintering. For example, during slip casting the movement of water from the liquid slurry into the porous mold creates small nonuniformities in the green density of the component and can lead to residual stresses after firing. One of the major benefits of the ceramic gelcasting process is that a uniform slurry is created and poured into a mold, where gelation of the liquid vehicle locks the constituent powder particles into place before settling, floatation, flocculation, or other source of inhomogeneities can operate.

On the other hand, there are many applications in which it is desirable to have a dense ceramic and/or metal component in which the properties vary in some way throughout the article. It may be desirable to produce an article characterized by high hardness on one surface and high toughness in the interior, for example. Particularly for uses involving microwave energy, it is often desirable to have the loss tangent and dielectric constant of an article vary so that microwave energy can be effectively absorbed by the article while minimizing reflections.

OBJECTS OF THE INVENTION

Accordingly, objects of the present invention include provision of methods of making metallic, ceramic, and/or composite articles having compositions that are graded spatially within the articles so that one or more physical properties of the finished articles vary in some desired way there throughout. Such methods include provisions for minimizing the effects of variable properties of the constituents, Such as sintering characteristics. Further and other objects of the present invention will become apparent from the description contained herein.

SUMMARY OF THE INVENTION

In accordance with one aspect of the present invention, the foregoing and other objects are achieved by a gelcasting method of making an internally graded article which includes the steps of:
 a. preparing at least two slurries, each of the slurries including a different gelcastable powder suspended in a gelcasting solution, the slurries characterized by having comparable shrinkage upon drying and sintering thereof;
 b. casting the slurries into a mold having a selected shape, wherein relative proportions of the slurries is varied in at least one direction within the selected shape;
 c. gelling the slurries to form a solid gel while preserving the variation in relative proportions of the slurries;
 d. drying the gel to form a dried green body;
 e. sintering the dry green body to form a solid object, at least one property thereof varying because of the variation in relative proportions of the starting slurries.

In accordance with another aspect of the present invention, a gelcasting method of making an internally graded article includes the steps of:
 a. preparing a slurry including a least two different phases suspended in a gelcasting solution, the phases characterized by having different settling characteristics;
 b. casting the slurry into a mold having a selected shape;
 c. allowing the slurry to stand for a sufficient period of time to permit desired differential settling of said different phases in order to achieve a vertical compositional gradient in the molded slurry;
 d. gelling the slurry to form a solid gel while preserving the vertical compositional gradient in the molded slurry;
 d. drying the gel to form a dried green body; and
 e. sintering the dry green body to form a solid object, at least one property thereof varying along one direction because of the vertical compositional gradient in the molded slurry.

DETAILED DESCRIPTION OF THE INVENTION

Applicants have discovered, surprisingly, that the gelcasting process can be modified to create such Functionally Graded Materials (FGM). The invention can be carried out in several ways. First, two components (phases) which are at least partially miscible in one another can be dispersed into two slurries. These two slurries can then be poured into a mold in layers or continuously blended as the mold is filled, thereby creating a desired compositional gradation within the object being molded. The slurries are then gelled to lock the constituent particles into the desired nonuniform distribution. Alternatively, several phases can be dispersed into a common gelcasting slurry, which is initially homogeneous. This slurry is poured into a mold and allowed to settle for some period of time sufficient to create a compositional gradient in the vertical direction through the action of buoyancy forces. After the desired compositional gradient is established, gelation of the vehicle locks it into place, preventing further settling of the individual constituents.

As will be shown in the Examples, a key aspect of the inventive method is that the individual slurries must have comparable sinterability so that the sintering shrinkage is substantially uniform throughout the body even though the composition is not. By matching the sintering shrinkage, distortion of the body dulling sintering is thereby minimized or avoided.

The invention makes use of the fact that gelcasting slurries are generally highly fluid with well-dispersed particulate phases suspended in such a way that two such slurries can, in principle, be blended to create a composition intermediate between the two. The mixed slurries could therefore be layered into a mold or blended (through a static mixer, for example) to provide a continuously graded composition as the mold is filled.

Although two slurries may be suitable for gelcasting and sintering individually, blended articles having varied compositions can be subject to warpage, cracking, and other problems that arise because of differences in the amount of shrinkage which each composition undergoes during sintering. The present invention provides a method of making a functionally graded material which eliminates the aforementioned problem by tailoring the individual slurries so that they have comparable sinterability even though they have different compositions.

Methods of making FGMs in accordance with the present invention include, but are not limited to, layered casting, continuously graded casting, and casting with controlled settling.

EXAMPLE I

Figure 1:
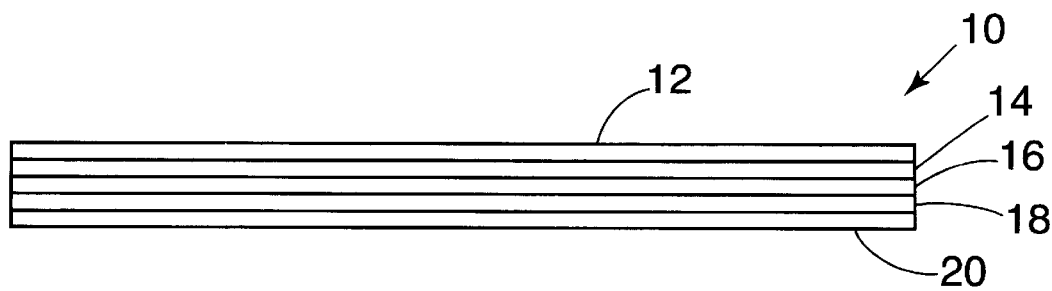
FIG. 1 is a schematic view of a 5-layered functionally graded material (FGM) in accordance with the present invention.

Experiments to fabricate $Al_2O_3$/SiC FGM samples by a layered gelcasting method were conducted from three arrays of slurry compositions as described in Table I. Referring to FIG. 1, rectangular, bar shaped specimens 10 of approximately 0.25"×0.50"×3.00" were fabricated by pouring equal aliquots of each slurry composition into a mold in successive layers, followed by gel polymerization to lock in the structure and preserve the layers.

In a first array of 55 v. % solids slurries, compositionally graded specimens of $Al_2O_3$ and SiC powders were made by layering five slurries (Arrays 1-1 to 1-5, Table I) with incrementally increasing proportions of SiC. The first layer 12 of each of the specimens comprised essentially 100% $Al_2O_3$. SiC replaced $Al_2O_3$ in each successive layer in relative amounts of 0% 12, 10% 14, 20% 16, 30% 18, and 40% 20, respectively. Although the gelcasting (forming) phase of this array of slurries was successful, excessive warpage and anisotropic shrinkage occurred in specimens 10 during the sintering stage due to different sintering kinetics for the two materials. For example, on specimen No. 1–5 for the pure $Al_2O_3$ layer, ~14.2% shrinkage occurred (from beginning wet to post-sintering). On the opposing end containing 40% SiC, shrinkage was only ~4.0%. (Reference specimens 1-1-1-5)

In a second array of experiments similar to that above, the total solids loading was increased to 60 v. % (in efforts to minimize differential shrinkage caused by the changing compositions). The first layer of each of the specimens comprised essentially 100% $Al_2O_3$. SiC replaced $Al_2O_3$ in each successive layer in relative amounts of 0%, 10%, 20%, 30%, 40%, and 50% additions respectively (for six layers total).

Figure 2:
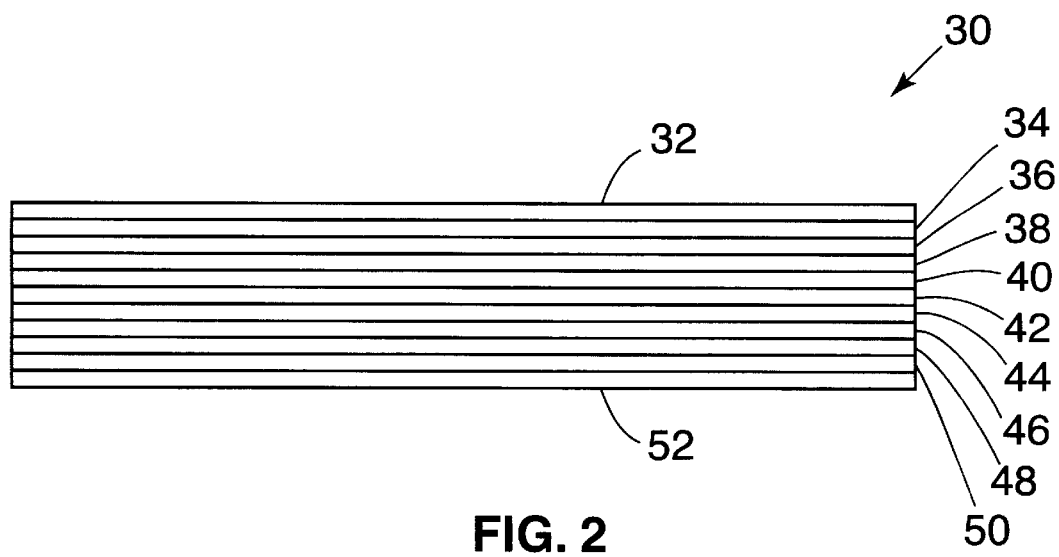
FIG. 2 is a schematic view of an 11-layered functionally graded material in accordance with the present invention.

Referring to FIG. 2, in another array of experiments, the objective was to produce specimens 30 having bilateral symmetry, thus producing a continuously graded material that would yield a graded dielectric loss over its length. Eleven layers containing 0% 32, 10% 34, 20% 36, 30% 38, 40% 40, 50% 42, 40% 44, 30% 46, 20% 48, 10% 50, 0% 52 additions of SiC were poured into molds and gelled to yield specimens 30 with opposite ends composed of $Al_2O_3$ and graded symmetrically toward the center (increasing the amounts of SiC with each successive layer) to a center composition of 50/50 $Al_2O_3$/SiC (for eleven layers total). The gelcasting forming for this array was also successful, however, once again, excessive warpage and shrinkage still occurred during the sintering stage due to anisotropic sintering kinetics. For example, on specimen No. 2-1 for the pure $Al_2O_3$ end layer, approximately 13% shrinkage occurred from the beginning, wet state to the post-sintering state. On the center layer containing 50% SiC, shrinkage was only about 2.5% (Reference specimens 2-1–2-6). (Table I follows on next page.)

TABLE I

| Slurry array ID | FGM slurry system ID | Monomer system* | Dispersant | $Al_2O_3$** SiC *** (V. %) | SiC designation | SiC nominal particle size | Solids (V. %)† | $Al_2O_3$ grit content †† | $Al_2O_3$ grit particle size |
|---|---|---|---|---|---|---|---|---|---|
| 1 | 1-1 | MAM:MBAM | Darvan 821-A | 100% $Al_2O_3$ | NA | NA | 55.00 | NA | NA |
| 1 | 1-2 | MAM:MBAM | Darvan 821-A | 90%/10% | HHSC 1200 | 5 $\mu$m | 55.00 | NA | NA |
| 1 | 1-3 | MAM:MBAM | Darvan 821-A | 80%/20% | HSC 600 | 10 $\mu$m | 55.00 | NA | NA |
| 1 | 1-4 | MAM:MBAM | Darvan 821-A | 70%/30% | HSC 500 | 13 $\mu$m | 55.00 | NA | NA |
| 1 | 1-5 | MAM:MBAM | Darvan 821-A | 60%/40% | HSC 400 | 15 $\mu$m | 55.00 | NA | NA |
| 2 | 2-1 | MAM:MBAM | Darvan 821-A | 100% $Al_2O_3$ | NA | NA | 60.00 | NA | NA |
| 2 | 2-2 | MAM:MBAM | Darvan 821-A | 90%/10% | HHSC 1200 | 5 $\mu$m | 60.00 | NA | NA |
| 2 | 2-3 | MAM:MBAM | Darvan 821-A | 80%/20% | HSC 600 | 10 $\mu$m | 60.00 | NA | NA |
| 2 | 2-4 | MAM:MBAM | Darvan 821-A | 70%/30% | HSC 500 | 13 $\mu$m | 60.00 | NA | NA |
| 2 | 2-5 | MAM:MBAM | Darvan 821-A | 60%/40% | HSC 400 | 15 $\mu$m | 60.00 | NA | NA |
| 2 | 2-6 | MAM:MBAM | Darvan 821-A | 50%/50% | HSC 400 | 15 $\mu$m | 60.00 | NA | NA |
| 3 | 3-1 | MAM:MBAM | Darvan 821-A | 100% $Al_2O_3$ | NA | NA | 60.00 | 50% | 14 $\mu$ |
| 3 | 3-2 | MAM:MBAM | Darvan 821-A | 90%/10% | HHSC 1200 | 5 $\mu$m | 60.00 | 40% | 14 $\mu$ |
| 3 | 3-3 | MAM:MBAM | Darvan 821-A | 80%/20% | HSC 600 | 10 $\mu$m | 60.00 | 30% | 9 $\mu$ |
| 3 | 3-4 | MAM:MBAM | Darvan 821-A | 70%/30% | HSC 500 | 13 $\mu$m | 60.00 | 20% | 5 $\mu$ |
| 3 | 3-5 | MAM:MBAM | Darvan 821-A | 60%/40% | HSC 400 | 15 $\mu$m | 60.00 | 15% 3 $\mu$ | 3 $\mu$ |
| 3 | 3-6 | MAM:MBAM | Darvan 821-A | 50%/50% | HSC 400 | 15 $\mu$m | 60.00 | 10% 3 $\mu$ | 3 $\mu$ |

*MAM = methacrylamide; MBAM = methylenebisacrylamide
**RCLS-DBM obtained from Reynolds Metals, Richmond, VA
*** SiC obtained from Superior Graphite Co., Chicago, IL.

TABLE I-continued

| Slurry array ID | FGM slurry system ID | Monomer system* | Dispersant | Al₂O₃** SiC *** (V. %) | SiC designation | SiC nominal particle size | Solids (V. %)† | Al₂O₃ grit content †† | Al₂O₃ grit particle size |
|---|---|---|---|---|---|---|---|---|---|

†Solids includes all Al₂O₃ and SiC powders.
†† Al₂O₃ Grit v. % is expressed as the proportion of the total Al₂O₃ content, i.e. for slurry 3-1, 50% of the total Al₂O₃ content is supplied by Al₂O₃ grit.

EXAMPLE II

After considering the principles which were causing the anisotropic sintering, the amount of shrinkage in each successive layer was tailored by adding fully dense Al₂O₃ grit (in increasing proportions and also increasing particle sizes) toward the high Al₂O₃ ends. In this manner, as the Al₂O₃ v. % increased, the grit size and the grit v. 1% was also increased, as shown in Table I. This reduced the shrinkage because the dense Al₂O₃ grit served as refractory filler material. For example, on specimen No. 3-2 for the pure Al₂O₃ layer, only about 6.25% shrinkage occurred (from beginning wet to post-sintering). On the layer containing 50% SiC, shrinkage was about 5.6%. Again the objective was to grade some of the specimens to have bilateral symmetry; (0%, 10%, 20%, 30%, 40%, 50%, 40%, 30%, 20%, 10%, 0% additions of SiC) thus opposite ends would be Al₂O₃ only, graded symmetrically toward the center (increasing the amounts of SiC with each successive layer) to a center composition of 50/50 Al₂O₃/SiC (for eleven layers total). Thus, careful selection of material particle sizing as well as fractional percent has demonstrated a method of tailoring shrinkage for ceramic functionally graded material composites (Reference specimens 3-1–3-2).

EXAMPLE III

Figure 4:
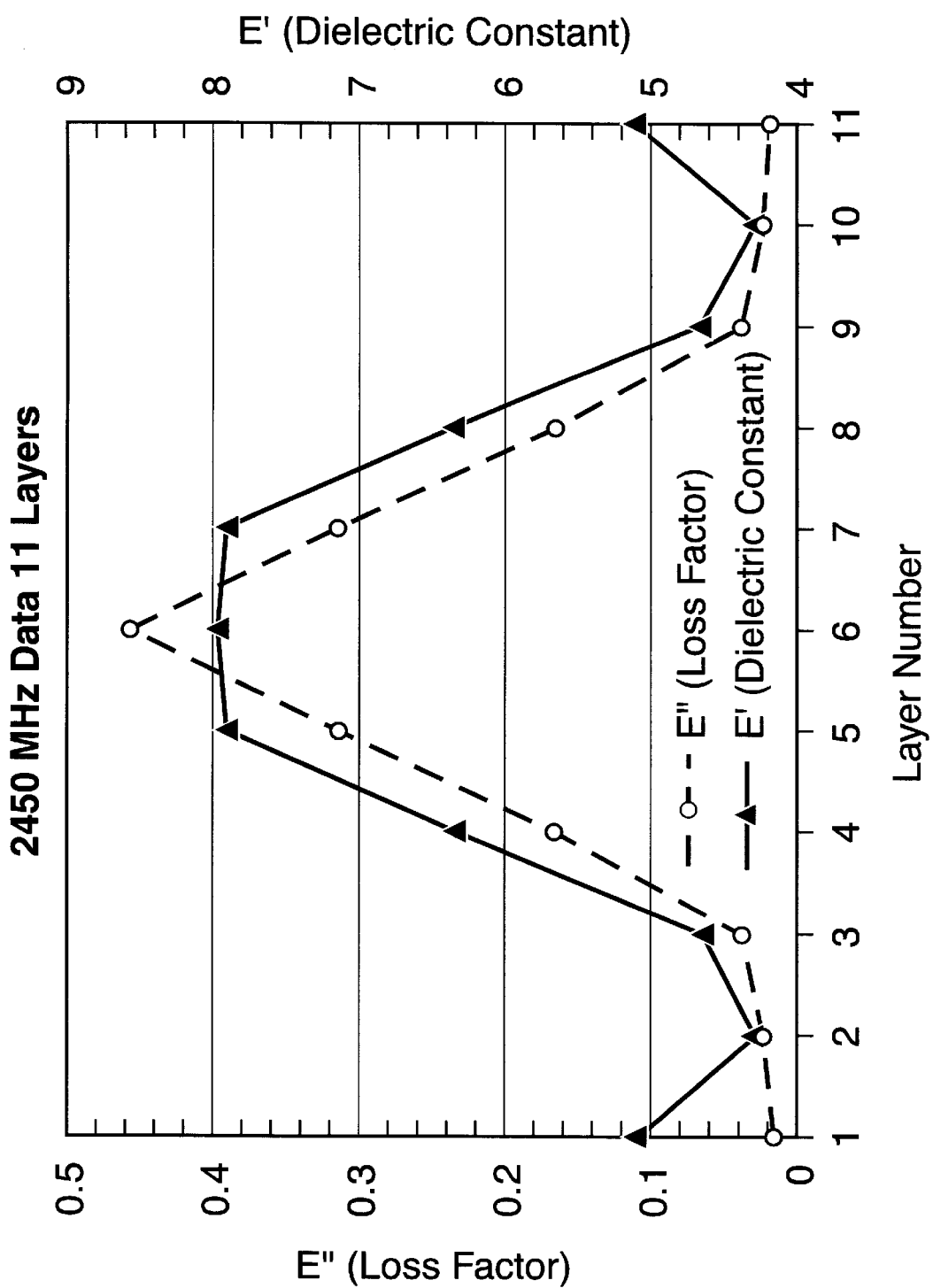
FIG. 4 shows the distribution of properties along the length of a functionally graded ceramic component made in accordance with the present Invention. For a better understanding of the present invention, together with other and further objects, advantages and capabilities thereof, reference is prepared to the following disclosure and appended claims in connection with the above-described drawings.

The specimens fabricated in Example 2, designed to yield a stepwise grading of SiC content in Al₂O₃ between 0% and 50%, are used to attenuate microwaves in various applications. As shown in FIG. 4, a sample prepared according to the method above had a gradient of its dielectric properties along its length corresponding to the compositional gradient established by the inventive technique. Skilled artisans will appreciate that an insulating rod with such tapering of its dielectric properties will be useful in applications such as insulator rods in a helix travelling wave tube.

An alternate method of inducing a particular amount of grading is to prepare a gelcasting slurry having at least two different dispersed phases having different settling characteristics. All materials are added to the same slurry, introduced into a mold, and allowed to stand for a sufficient period of time to permit differential settling, flotation, or flocculation to effect fractionation in order to achieve a vertical compositional gradient in the molded slurry. Once the desired gradient is attained, the structure is "locked-in" using thermally activated gelation. By carefully timed initiation and polymerization, the amount of settling and thus the amount of compositional grading can be controlled. Settling characteristics of the materials, for example, particle size, density, and viscosity of the surrounding medium all contribute to the distribution of settling fractions of the settling metal powder. Time becomes the controllable variable following selection of materials.

EXAMPLE IV

Figure 3:
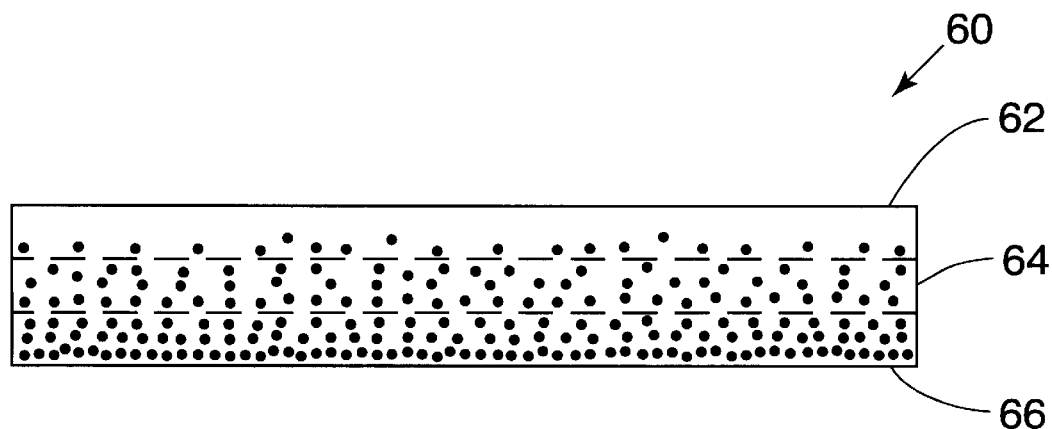
FIG. 3 is a schematic view of a continuous functionally graded material in accordance with the present invention.

Graded specimens of Al₂O₃ and Ni metal powders were fabricated by gelcasting methods. A 55 v. % slurry of Al₂O₃ (RCLS DBM) was first prepared by an ordinary mixing procedure. Ni metal powder was then added at 10 v. % (of the solids) to the slurry and thoroughly mixed (Table 2). The initiator and catalyst were added, and the slurries were poured into molds to gel. Since the density of the Ni powder is 8.9 g/cc, and the density of the Al₂O₃ slurry was only 2.63 g/cc, the Ni metal powder settled through the Al₂O₃ slurry. In these experiments, prepared mixtures containing the metal powder were allowed to stand (vertically) in cylindrical molds for varying amounts of time, for example, 0 min., 5 min., 10 min., followed by thermal gelation. By increasing the initiator and catalyst, gelation was achieved in less than 5 minutes, thus locking in the graded structure. The specimens so produced exhibited distinctive grading in a continuous manner from top to bottom. As an example, FIG. 3 shows a specimen 60 having a lower concentration of Ni in a top region 62, graduating to an intermediate concentration of Ni in a middle region 62, graduating to a higher concentration of Ni in a bottom region 66.

Specimens which were allowed to settle only during the polymerization stage (0 min.) exhibited the most gradual grading over the distance (3" depth). By placing a relatively strong ceramic magnet on the as-gelled samples, the degree of grading can easily be qualitatively measured. Another way to carry out this invention is to place magnets along some direction of the forming mold (prior to initiating polymerization), to induce a desired type of compositional grading via the applied magnetic field as opposed to simple gravimetric settling.

TABLE II

| | Density (G./CC) | (g. used) | volume (cc) | % (by volume) |
|---|---|---|---|---|
| 55 Vol % Al₂O₃ Slurry | 2.63 | 100 | 38.02 | 90% |
| Nickel powder | 8.9 | 38 | 4.27 | 10% |
| | | Totals: | 42.29 (cc) | 100.00% |

It will be appreciated that the term differential settling also encompasses differential buoyancy. For example, the second component in the slurry might be small particles (or droplets) of a polymer intended to act as fugitive pore formers during sintering. If these particles are less dense than the liquid slurry, they will preferentially float upward, creating a vertical distribution of pores in the final sintered product. This method could be used to replicate the variable density of bone, for example, for a bone repair or prosthesis material.

Variable properties of FGM include, but are not limited to, dielectric constant, magnetic permeability, hardness, strength, fracture toughness, electrical conductivity, thermal expansion, dielectric loss, color, and chemical composition.

While there has been shown and described what are at present considered the preferred embodiments of the invention, it will be obvious to those skilled in the art that various changes and modifications can be prepared therein without departing from the scope of the inventions defined by the appended claims.

What is claimed is:

1. A gelcasting method of making an internally graded article comprising the steps of:
   a. preparing at least two slurries, each of said slurries comprising a different gelcastable powder suspended in a gelcasting solution, said slurries characterized by having comparable shrinkage upon drying and sintering thereof,
   b. casting said slurries into a mold having a selected shape, wherein relative proportions of said slurries is varied in at least one direction within said selected shape;
   c. gelling said slurries to form a solid gel while preserving the variation in relative proportions of said slurries;
   d. drying said gel to form a dried green body;
   e. sintering said dry green body to form a solid object, at least one of whose properties vary along said direction because of the variation in relative proportions of said starting slurries.

2. The method of claim 1 wherein said powders are selected from the group consisting of metals, ceramics, and mixtures thereof.

3. The method of claim 1 wherein the relative proportions of said slurries are varied in a stepwise manner.

4. The method of claim 1 wherein said slurries are at least partially miscible in one another and relative proportions of said slurries are varied in a continuous manner in at least one direction.

5. The method of claim 1 wherein said properties are selected from the group comprising: density, dielectric constant, magnetic permeability, hardness, strength, fracture toughness, electrical conductivity, thermal expansion, dielectric loss, color, and chemical composition.

* * * * *